Patented Aug. 6, 1929.

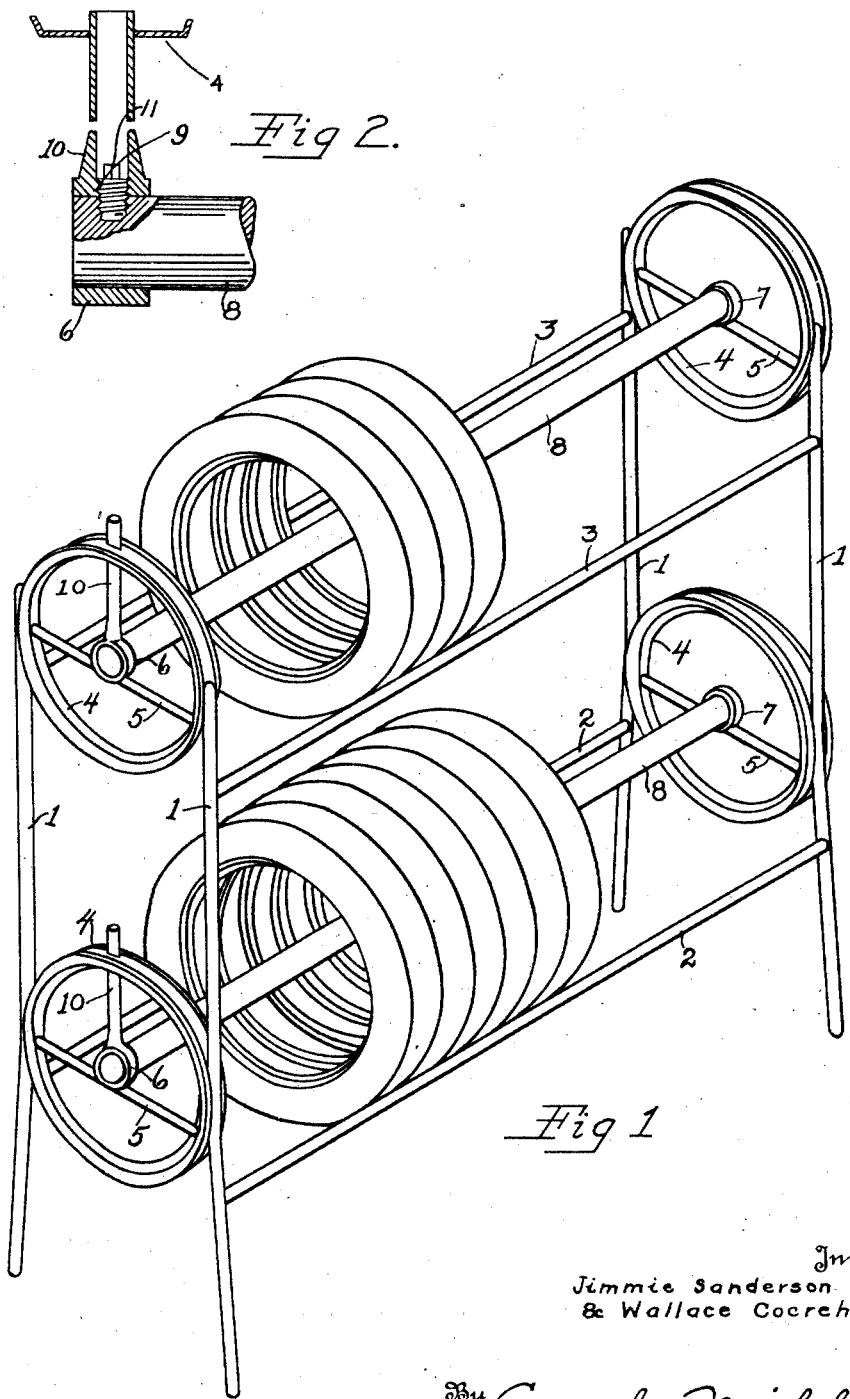

1,723,526

UNITED STATES PATENT OFFICE.

JIMMIE SANDERSON AND WALLACE COCREHAM, OF MARTINDALE, TEXAS.

AUTOMOBILE CASING RACK.

Application filed September 28, 1928. Serial No. 308,918.

This invention relates in general to racks for the storage of automobile tires and more particularly it has reference to tire racks of skeleton construction which may be utilized for exhibition purposes and sale.

A principal object of this invention is to provide a tire rack in which a large quantity of tires may be stored in a comparatively small space, and in which the tires may easily be placed and removed.

Another object of the invention is to provide a tire rack in which the tires are locked therein in order to prevent their surreptitious removal.

Still another object is to provide a tire rack which is of simple and economical construction, easily assembled, solid and durable, and not unsightly.

Our invention consists in a frame work in which the tires are vertically mounted, side by side, and a central bar or tube which is projected thru the tires is locked to the frame at either end to prevent the removal of the tires.

The invention is fully disclosed in the description and claim following, reference being had to the accompanying drawings in which:

Figure 1 is an isometric projection showing the rack with a number of tires placed thereon.

Figure 2 shows a section thru the locking ring and a fragmentary portion of the central locking rod.

In these above mentioned illustrations which accompany and form a part of the specification, and in which like reference numerals indicate corresponding parts, 1 indicates the end stantions or uprights of the frame which are joined longitudinally by the lower lateral members 2 and the upper members 3. At the ends the frame is built up of circular member 4 to which the stantions 1 are attached. These circular members, as shown in the illustrations, may be tire rims. Tire rims provide for a cheap construction and at the same time add to the appearance of the device. The circular end members 4 are provided with cross bars 5 to which are attached the locking rings and supporting rings 7. Thru the locking and supporting rings 6 and 7 respectively are placed the locking bars 8 which are retained within the locking rings by a threaded plug 9 as shown in Figure 2.

The locking means as shown in Figure 2, consists in a locking ring having projection 10 which is centrally drilled and tapped for the reception of the locking plug 9. The plug 9 is surmounted by a squared head 11 which is considerably smaller in circumference than the hole into which the plug fits. This provides room for the admission of a key (not shown) which fits the head and which is utilized in screwing and unscrewing the plug within the tapped hole and thereby locking or unlocking the rod 8, which is drilled similarly for the reception of the plug when the hole in the rod and the hole in the locking ring are placed to register with each other.

In this description only a preferred form of construction is set forth to which we do not desire to be limited since many modifications in this construction may be made without departing from the scope of the invention.

The frame may be constructed of rods or bicycle tubing, the end member may be tire rims, as shown or other desirable members, and the locking device for retaining the locking bar or tube within the locking ring may be of any suitable form.

Having thus described our invention what we claim as new and desire to secure by Letters Patent is:—

In combination with a tire rack having longitudinal members for the support of tires, end members supporting retaining rings, retaining rods capable of being projected thru said rings and tires, and locking means in conjunction with said retaining rings comprising a cylindrical plug having a squared head threadedly fitted within said retaining ring and capable of engaging a corresponding threaded opening in the aforesaid retaining rod to prevent the removal of the rod from said ring, substantially as set forth.

In testimony whereof we affix our signatures.

JIMMIE SANDERSON.
WALLACE COCREHAM.